(12) United States Patent
Akamatsu

(10) Patent No.: US 7,027,079 B2
(45) Date of Patent: Apr. 11, 2006

(54) EXPOSURE APPARATUS INCLUDING A READ CIRCUIT FOR READING ELECTRICAL SIGNALS FROM A PLURALITY OF PHOTOELECTRIC CONVERTERS

(75) Inventor: Takahiro Akamatsu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 10/717,545

(22) Filed: Nov. 21, 2003

(65) Prior Publication Data
US 2004/0174425 A1    Sep. 9, 2004

(30) Foreign Application Priority Data
Nov. 29, 2002    (JP)    ............... 2002-348720

(51) Int. Cl.
*B41J 2/435*    (2006.01)
(52) U.S. Cl. ...................... 347/236; 347/246
(58) Field of Classification Search ........ 347/236–237, 347/246–247; 355/53; 358/482, 483; 257/225; 438/60; 377/57–63, 72
See application file for complete search history.

(56) References Cited

U.S. PATENT DOCUMENTS

| 4,584,607 A | * | 4/1986 | Miyazawa | .................. 358/482 |
| 4,804,978 A |   | 2/1989 | Tracy    | ......................... 347/246 |
| 5,650,643 A | * | 7/1997 | Konuma   | ...................... 257/225 |
| 6,424,405 B1 | * | 7/2002 | Kurosawa et al. | ............ 355/53 |

FOREIGN PATENT DOCUMENTS

| JP | 1-274020 | 1/1989 |
| JP | 2-5063 | 1/1990 |

* cited by examiner

*Primary Examiner*—Hai Pham
(74) *Attorney, Agent, or Firm*—Fitzpatrick, Cella, Harper & Scinto

(57) ABSTRACT

An exposure apparatus reads an electrical signal from a photoelectric sensor by using the time interval between emission pulses even at a high emission frequency of the light source. A photoelectric sensor attached to an exposure apparatus which exposes a substrate to a pulse beam emitted by a light source for generating a pulse beam has a plurality of photoelectric converters. The photoelectric converters are divided into a plurality of blocks. While charges are read from each block by using one time interval between pulse beams, charges in all the photoelectric converters are read by using a plurality of time intervals between pulse beams.

3 Claims, 7 Drawing Sheets

SEMICONDUCTOR DEVICE MANUFACTURING FLOW

WAFER PROCESS

EXPOSURE APPARATUS INCLUDING A READ CIRCUIT FOR READING ELECTRICAL SIGNALS FROM A PLURALITY OF PHOTOELECTRIC CONVERTERS

FIELD OF THE INVENTION

The present invention relates to an exposure apparatus suitable for manufacturing a device such as a semiconductor device or liquid crystal display device.

BACKGROUND OF THE INVENTION

An exposure apparatus which transfers the pattern of a master such as a reticle onto a photosensitive material applied to a substrate such as a wafer or glass plate is used to manufacture a device such as a semiconductor device or liquid crystal display device by photolithography.

In general, a photosensitive material applied to a wafer has a predetermined proper exposure amount. In a conventional exposure apparatus, a beam splitter is arranged in an illumination optical system for illumination light. The light quantity of part of the illumination light split by the beam splitter is monitored by a photoelectric sensor (integrated exposure amount sensor), thereby indirectly monitoring the exposure amount of the wafer. When the exposure amount of the wafer reaches a proper exposure amount, exposure to the current shot region of the wafer is stopped to control the exposure amount.

In such an exposure apparatus, the relationship between the illuminance on the wafer and an output from the integrated exposure amount sensor in the illumination optical system must be measured in advance. For this measurement, a photoelectric sensor for measuring the illuminance on the wafer is generally set on a stage which holds the wafer. The photoelectric sensor on the stage is often used to measure the illuminance uniformity of exposure light incident on the wafer via a projection optical system, and is generally called an illuminance uniformity sensor.

The illuminance uniformity sensor is generally a single photodiode (light-receiving element or photoelectric converter), or a photodiode array or CCD (Charge Coupled Device) comprised of a plurality of photodiodes. A line or area type photoelectric sensor such as the photodiode array or CCD stores charges proportional to the incident light quantity output from the photodiode in a charge storage (capacitor) within the photoelectric sensor. Stored charges are read from the charge storage in accordance with a read command, converted from a current into a voltage, and used for various processes.

To calibrate an output from the illuminance uniformity sensor, an illuminance meter calibrated in advance is set below the projection optical system instead of a wafer, and the illuminance is measured by the calibration illuminance meter. The illuminance uniformity sensor to be calibrated is then moved below the projection optical system, the illuminance is similarly measured by the illuminance uniformity sensor, and an output is so adjusted as to be equal to an output from the calibration illuminance meter.

As a method of checking whether exposure amount control is correctly executed, a predetermined exposure amount is set, and the illuminance uniformity sensor is moved below the projection optical system instead of a wafer. In this state, while exposure amount control is executed on the basis of an output from the integrated exposure amount sensor, an exposure amount actually incident on the illuminance uniformity sensor is measured.

It is a recent trend to use an excimer laser source as an exposure light source in an exposure apparatus which sequentially exposes a plurality of shot regions on a wafer by a step & repeat method using a so called stepper. The excimer laser typically has an energy dispersion of about 10% for 3s between output pulses. To achieve a desired exposure amount precision of, e.g., 1% using a light source having such an energy dispersion, a wafer must be irradiated with at least 100 pulses to perform integrated exposure. For a small target exposure amount, the illuminance is decreased by a beam attenuation means set in the illumination optical system so as to make an actual exposure amount fall within the tolerance of the target exposure amount by integrated exposure of, e.g., 100 pulses.

However, the conventional arrangement requires a wide dynamic range for the integrated exposure amount sensor in the illumination optical system or the illuminance uniformity sensor on the stage. This is because these photoelectric sensors must measure light quantities ranging from a large light quantity which is not attenuated and is used for a large exposure amount to a small light quantity which is attenuated by the beam attenuation means and used for a small exposure amount. The front surface of the photoelectric sensor is covered with the beam attenuation means which adjusts the light quantity such that an optimal light quantity is incident on the photoelectric sensor. In general, the beam attenuation means is so set as not to saturate an output from the photoelectric sensor even if a maximum light quantity is incident on the photoelectric sensor. When the exposure amount is set small and a light quantity incident on the photoelectric sensor decreases, an output from the photoelectric sensor greatly decreases. As a result, the measurement precision decreases under the influence of noise by the dark current of the photoelectric sensor itself, thermal noise, and the linearity between the incident light quantity and output of the photoelectric sensor.

When the illuminance uniformity sensor adopts a line or area type photoelectric sensor such as a photodiode array or CCD comprised of a plurality of light-receiving elements (photoelectric converters), a long read time is taken to read output signals from all the light-receiving elements. The emission frequency of an excimer laser has recently been increased, and lasers having an emission frequency of 4 kHz or more become available. Such a high-frequency laser has a short time interval between emission pulses, and it becomes difficult to read output signals from all the light-receiving elements within this time interval.

SUMMARY OF THE INVENTION

The present invention has been made by giving attention particularly to the latter problem out of the two problems described above, and has as its object to provide an exposure apparatus which easily copes with an increase in the emission frequency of a light source and, more specifically, an exposure apparatus capable of properly reading an electrical signal from a photoelectric sensor by using the time interval between emission pulses even at a high emission frequency of the light source.

According to the present invention, an exposure apparatus, which transfers a pattern onto a substrate by using pulse beams periodically, successively emitted by a light source for generating a pulse beam, comprises a photoelectric array having a plurality of photoelectric converters which detect pulse beams as electrical signals, and a read circuit which reads the electrical signals from the plurality of photoelectric converters of the photoelectric array. The read circuit stores, in the plurality of photoelectric converters of the photoelectric array, charges corresponding to light quantities of pulse beams periodically, successively emitted by the light source to the photoelectric array, and reads electrical signals from all the plurality of photoelectric converters by using a plurality of time intervals between the pulse beams while reading electrical signals from some of the plurality of photoelectric converters by using each time interval between the pulse beams. With this arrangement, even when the emission frequency of the light source increases, an electrical signal can be properly read from a photoelectric sensor by using the time interval between emission pulses. The obtained electrical signal can be utilized for control of the exposure amount, calibration of the exposure control system, or the like. The electrical signal should be interpreted to have the widest meaning, and the term "electrical signal" includes all electrical signals such as an analog signal, a digital signal, and electrically expressible numerical information (data).

According to a preferred aspect of the present invention, the read circuit preferably includes a reset circuit which resets a photoelectric converter from which an electrical signal has been read every time an electrical signal is read from the photoelectric array.

According to another preferred aspect of the present invention, the exposure apparatus preferably further comprises an adder which adds electrical signals read from the same photoelectric converter at different times.

According to still another preferred aspect of the present invention, the number of photoelectric converters from which electrical signals are read by the read circuit at one time interval between pulses is preferably determined in accordance with an emission frequency of the light source. For example, the number of photoelectric converters can be determined to be a relatively small number for a high emission frequency of the light source, and a relatively large number for a low emission frequency of the light source. Alternatively, the number of photoelectric converters can be determined to be as large a number as possible or a number suitable for data processing within a range in which electrical signals can be read at one time interval between pulses.

According to still another preferred aspect of the present invention, a count at which charges corresponding to pulse beams periodically, successively emitted by the light source to the photoelectric array are integrated and stored in the plurality of photoelectric converters is preferably determined in accordance with an intensity of the pulse beam emitted by the light source. For example, the integration/storage count can be so determined as to operate the photoelectric array within a dynamic range limited to a predetermined range. By the method of limiting the dynamic range, a decrease in measurement precision or detection precision by dark current noise of the photoelectric array (or photoelectric converter), thermal noise, or the linearity of the input/output characteristic can be suppressed to a desired level or less.

According to a typical aspect of the present invention, the photoelectric array can be arranged on, e.g., a stage which holds the substrate. Alternatively, the photoelectric array may be so arranged as to detect an integrated light quantity of a pulse beam split from an optical path extending from the light source to the substrate.

According to still another aspect of the present invention, an exposure apparatus, which transfers a pattern onto a substrate by using pulse beams periodically, successively emitted by a light source for generating a pulse beam, comprises a photoelectric sensor which detects a pulse beam as an electrical signal, and a read circuit which reads the electrical signal from the photoelectric sensor. The number of pulses corresponding to charges to be stored in the photoelectric sensor between one read operation and a next read operation by the read circuit is determined in accordance with an intensity of the pulse beam emitted by the light source.

According to still another aspect, the photoelectric sensor can be typically arranged on a stage which holds the substrate. Alternatively, the photoelectric sensor may be so arranged as to detect an integrated light quantity of a pulse beam split from an optical path extending from the light source to the substrate.

In the above inventions or preferred aspects, the light source is preferably an excimer laser.

The advantages of the exposure apparatus according to the present invention can be reflected even in various devices which can be manufactured by the exposure apparatus. As an application example of the exposure apparatus according to the present invention, the exposure apparatus of the present invention can be used in a transfer step in a device manufacturing method using lithography including a transfer step of transferring a pattern onto a photosensitive agent applied to a substrate, and a developing step of developing the photosensitive agent.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described below with reference to the accompanying drawings.

Figure 1:
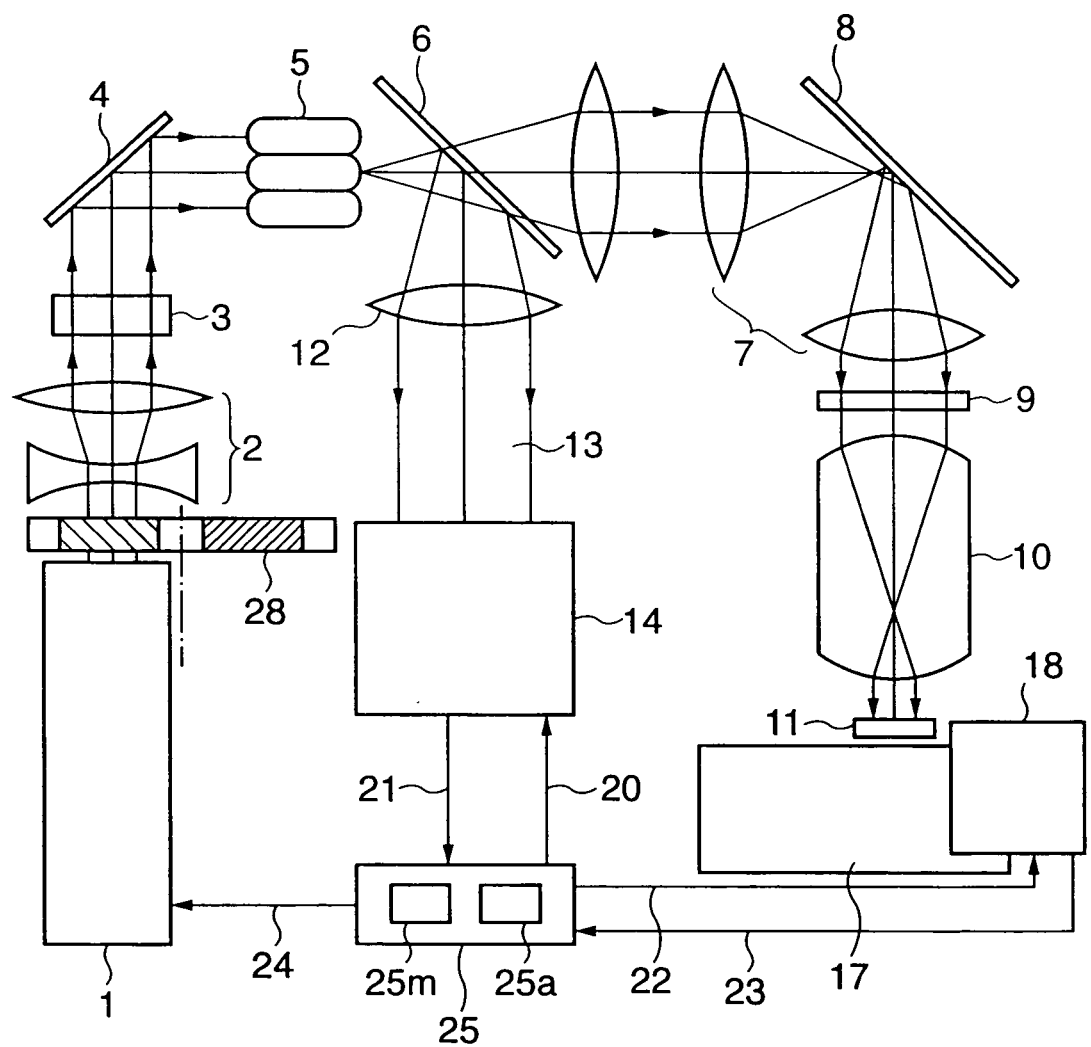
FIG. 1 is a view showing the schematic arrangement of an exposure apparatus according to a preferred embodiment of the present invention.

FIG. 1 is a view showing the schematic arrangement of an exposure apparatus according to a preferred embodiment of the present invention. The exposure apparatus shown in FIG. 1 can be implemented as a step & repeat exposure apparatus (so-called stepper) or a step & scan exposure apparatus (so-called scanner). A light source 1 generates a pulse beam as illumination light, and is typically an excimer laser. The light source 1 generates a pulse beam in accordance with an emission command sent from a main control system 25. The pulse beam means light having a pulse waveform along the time axis.

A beam attenuation mechanism 28 adjusts the light quantity of illumination light so as to adjust the intensity (illuminance) of light incident on a wafer 11. The beam attenuation mechanism 28 has, e.g., a turret structure which holds a plurality of neutral density filters having different transmittances, and switches the beam attenuation ratio by the filters. For example, the beam attenuation mechanism 28 can be equipped with 25 neutral density filters whose beam attenuation ratio changes by 10%. In this case, the transmittances of the neutral density filters are 100%, 90%, 81%, 72.9%, 65.6%, 59%, 53.1%, 47.8%, 43%, 38.7%, 34.9%, 31.4%, 28.2%, 25.4%, 22.9%, 20.6%, 18.5%, 16.7%, 15%, 13.5%, 12.2%, 11%, 9.8%, 8.9%, and 8.0%. The beam attenuation ratio is a value obtained by subtracting the transmittance from 100%.

A beam shaping optical system 2 shapes illumination light emitted by the excimer laser 1 into a parallel beam having a predetermined sectional shape. A quarter-wave plate 3 converts linearly polarized illumination light having passed through the beam shaping optical system 2 into circularly polarized illumination light. Circularly polarized illumination light is reflected by a reflecting mirror 4 to enter a fly eye lens 5. Many light source images are formed on the exit surface of the fly-eye lens 5, making the illuminance distribution of illumination light uniform.

A beam splitter 6 transmits most of illumination light having passed through the fly-eye lens 5, and reflects the remaining part of illumination light to an integrated exposure amount sensor 14 via a condenser lens 12. Illumination light having passed through the beam splitter 6 illuminates a reticle (master) 9 via an illumination optical system 7 with a uniform illuminance distribution. In this embodiment, a reflecting mirror 8 is arranged in the illumination optical system 7 to deflect illumination light.

A pattern formed on the reticle 9 is projected onto the wafer (substrate) 11 via a projection optical system 10 to expose the wafer 11 to pattern light.

Light reflected by the beam splitter 6 is condensed on the light-receiving surface of the integrated exposure amount sensor 14 by the condenser lens 12. The integrated exposure amount sensor 14 can be formed by a photoelectric sensor which converts an optical signal into an electrical signal. As is well known, the photoelectric sensor includes a photodiode or a CCD constituted by integrating photodiodes.

An illuminance uniformity sensor 18 for detecting the illuminance uniformity on the wafer 11 is mounted on a stage 17 which holds and moves the wafer 11. The illuminance uniformity sensor 18 can also be formed by a photoelectric sensor.

Figure 2:
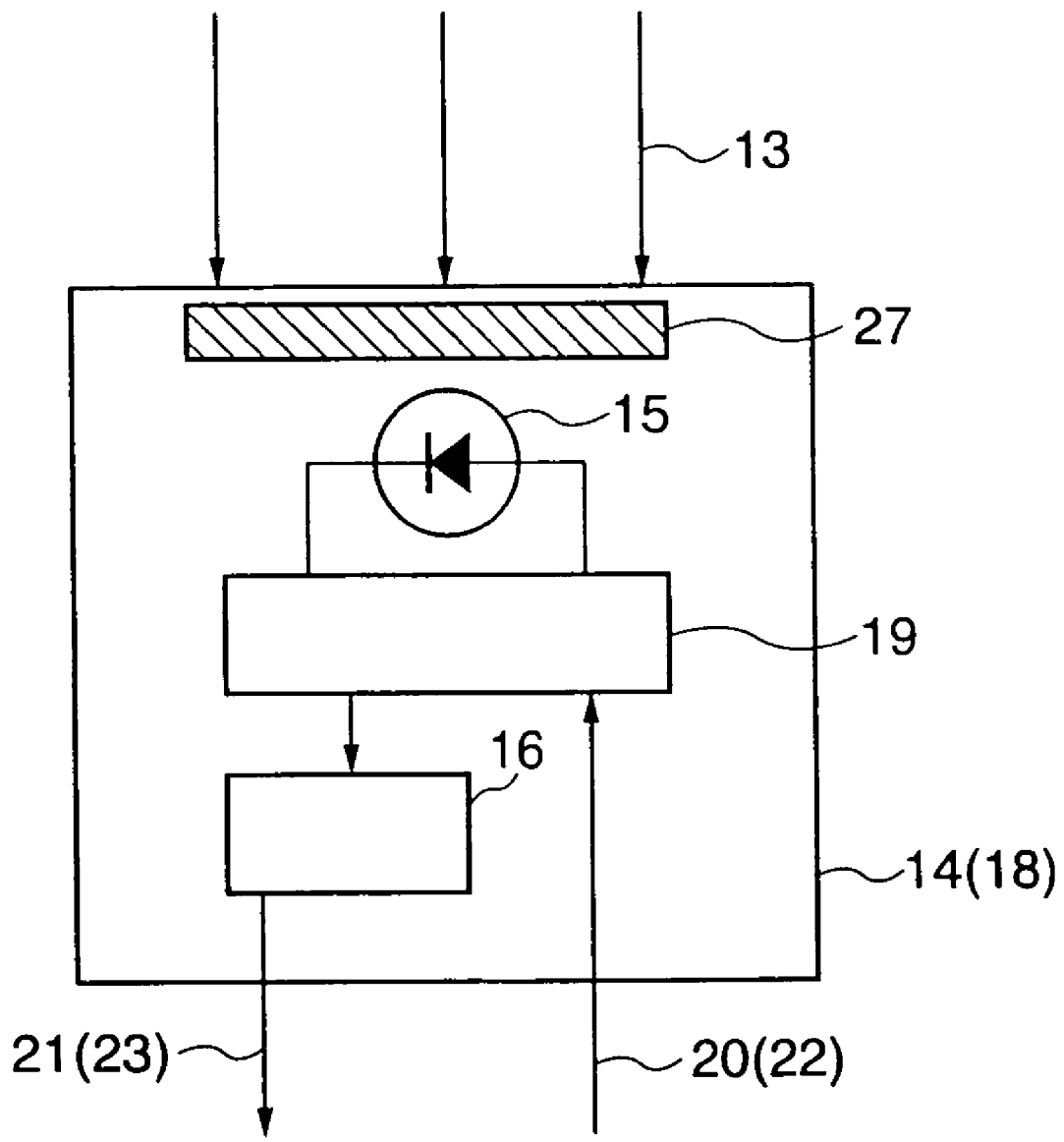
FIG. 2 is a diagram showing the basic structure of a integrated exposure amount sensor and an illuminance uniformity sensor (photoelectric sensors) in FIG. 1.

FIG. 2 is a diagram showing the basic structure of the integrated exposure amount sensor 14 and illuminance uniformity sensor 18, i.e., photoelectric sensors in FIG. 1. The photoelectric sensor (integrated exposure amount sensor 14 or illuminance uniformity sensor 18) is comprised of a single light-receiving element (photoelectric converter). The photoelectric sensor can be formed by a plurality of light-receiving elements (photoelectric converters) which are arranged one- or two-dimensionally.

A photodiode 15 serving as a light receiving element is typically arranged such that its light-receiving surface coincides with a position flush with or conjugate to the exposure surface of the wafer 11 (FIG. 1). The front surface of the photodiode 15 is covered with a neutral-density filter 27 which transmits an optimal light quantity to the photodiode 15 when a neutral-density filter having a transmittance of 100% (beam attenuation ratio of 0%) is selected in the beam attenuation mechanism 28. Charges (current) proportional to an incident light quantity generated by the photodiode 15 are stored in a charge storage (capacitor) 19. An output current from the charge storage 19 is converted into a voltage by a current-to-voltage converter 16, and the voltage is applied as exposure amount data 21 (23) to the main control system 25. The charge storage 19 receives a charge reset signal 20 (22) from the main control system 25.

Referring back to FIG. 1, a check operation for integrated exposure amount control will be explained. Letting D (J/m$^2$) be the set exposure amount (target exposure amount), P (W/m$^2$) be the illuminance on a wafer surface per pulse of a pulse beam generated by the light source 1, F (pls/sec) be the laser emission frequency, and M (pls) be the emission pulse count, the set exposure amount D is given by equation (1), and the emission pulse count M for obtaining the set exposure amount is given by equation (2):

$$D(J/m^2) = P(W/m^2) \cdot M(pls)/F(pls/sec) \quad (1)$$

$$M(pls) = D \cdot F/P \quad (2)$$

In a check of integrated exposure amount control, the illuminance uniformity sensor 18 is moved below the projection optical system 10 in place of a wafer, and integrated exposure amount control is executed on the basis of an output from the integrated exposure amount sensor 14 so as to obtain the set exposure amount. During this period, the light quantities of all pulse beams incident on the illuminance uniformity sensor 18 are integrated using the illuminance uniformity sensor 18 to obtain the integrated exposure amount. The integrated exposure amount is compared with the set exposure amount to calculate the control precision of the integrated exposure amount.

According to the first embodiment of the present invention, the pulse count by which integrated storage is executed in the illuminance uniformity sensor 18 is switched in accordance with the transmittance of the beam attenuation mechanism 28, i.e., the intensity of light incident on the illuminance uniformity sensor 18. More specifically, the pulse count is switched as follows. The following operation can be controlled by the main control system 25.

When a neutral-density filter having a transmittance of 100% is selected in the beam attenuation mechanism 28, integration of a pulse beam incident on the illuminance uniformity sensor 18 is executed as follows. Before emission of the light source (excimer laser) 1, the main control system 25 sends to the charge storage 19 of the illuminance uniformity sensor 18 the charge reset command signal 22 for resetting stored charges. The light source 1 is then caused to emit a pulse beam of one pulse. At this time, charges proportional to the light quantity of the pulse beam are generated in the photodiode 15, and stored in the charge storage 19. Stored charges are converted into a voltage by the current-to-voltage converter 16, and the voltage is sent as exposure amount data 23 to the main control system 25. The main control system 25 sends the charge reset command signal 22 to the charge storage 19. In response to this, charges stored in the charge storage 19 are reset. A series of operations using one pulse as a unit are repeated by a predetermined pulse count to sequentially send exposure amount data 23 to the main control system 25. All the exposure amount data 23 are added by an adder 25a in the main control system 25 to obtain an integrated exposure amount.

When a neutral-density filter having a transmittance of 47.8% is selected in the beam attenuation mechanism 28, integration of a pulse beam incident on the illuminance uniformity sensor 18 is executed as follows. Before emission of the light source (excimer laser) 1, the main control system 25 sends to the charge storage 19 the charge reset command signal 22 for resetting stored charges. The light source 1 is then caused to emit a pulse beam of one pulse. At this time, charges proportional to the light quantity of the pulse beam are generated in the photodiode 15, and stored in the charge storage 19. The light source 1 is caused to emit a pulse beam of one pulse without sending the charge reset signal 22 to the charge storage 19. Charges generated in the photodiode 15 are integrated to previous charges in the charge storage 19. Since the light quantity incident on the illuminance uniformity sensor 18 is attenuated to 47.8%, charges of two pulses are integrated in the illuminance uniformity sensor 18 to obtain almost the same charge amount as that upon selecting a neutral-density filter having a transmittance of 100%. Exposure amount data 23 of the two pulses is sent to the main control system 25. The main control system 25 sends the charge reset command signal 22 to the charge storage 19. In response to this, charges (two pulses) stored in the charge storage 19 are reset. A series of operations using two pulses as a unit are repeated by a predetermined pulse count to sequentially send exposure amount data 23 to the main control system 25. All the exposure amount data 23 are added by the adder 25a in the main control system 25 to obtain an integrated exposure amount.

When a neutral-density filter having a transmittance of 25.4% is selected in the beam attenuation mechanism 28, charges of four pulses are integrated and stored in the illuminance uniformity sensor 18, thereby storing almost the same charge amount as that upon selecting a neutral-density filter having a transmittance of 100%. A series of operations using four pulses as a unit are repeated by a predetermined pulse count to sequentially send exposure amount data 23 to the main control system 25. All the exposure amount data 23 are added by the adder 25a in the main control system 25 to obtain an integrated exposure amount.

In this manner, according to the first embodiment of the present invention, the pulse count by which storage accompanied by integration is executed in the charge storage 19 is changed in accordance with the beam attenuation ratio set by the beam attenuation mechanism 28 in the illumination optical system, i.e., the intensity of light incident on the illuminance uniformity sensor 18. As a result, an output from the charge storage 19 of the illuminance uniformity sensor 18 can be limited to a narrow dynamic range, substantially preventing the influence of noise by the dark current of the illuminance uniformity sensor 18 itself, thermal noise, and the linearity between the incident light quantity and output of the illuminance uniformity sensor 18.

The method of changing the pulse count by which storage accompanied by integration is executed in accordance with the intensity (illuminance) of light incident on the photoelectric sensor can be applied not only to a check of the integrated exposure amount, but also to evaluation of illuminance uniformity.

This photoelectric sensor control method can be applied not only to control of the illuminance uniformity sensor 18 but also to the integrated exposure amount sensor 14. In this case, the method can be applied not only to actual exposure of a wafer, but also to a check of integrated exposure amount control or evaluation of the transmittance of an optical system between the integrated exposure amount sensor and the illuminance uniformity sensor.

The photoelectric sensor control method can be applied not only to an exposure apparatus, but also to any apparatus having a light source for generating a pulse beam and a function of changing the intensity of a pulse beam incident on a photoelectric sensor.

As the second embodiment of the present invention, a method of solving the problem of the read time in the use of a photoelectric sensor in which light-receiving elements (photoelectric converters) are arrayed one- or two-dimensionally will be explained. This problem has been described in the "BACKGROUND OF THE INVENTION" section, but will be explained again with reference to FIG. 3.

Figure 3:
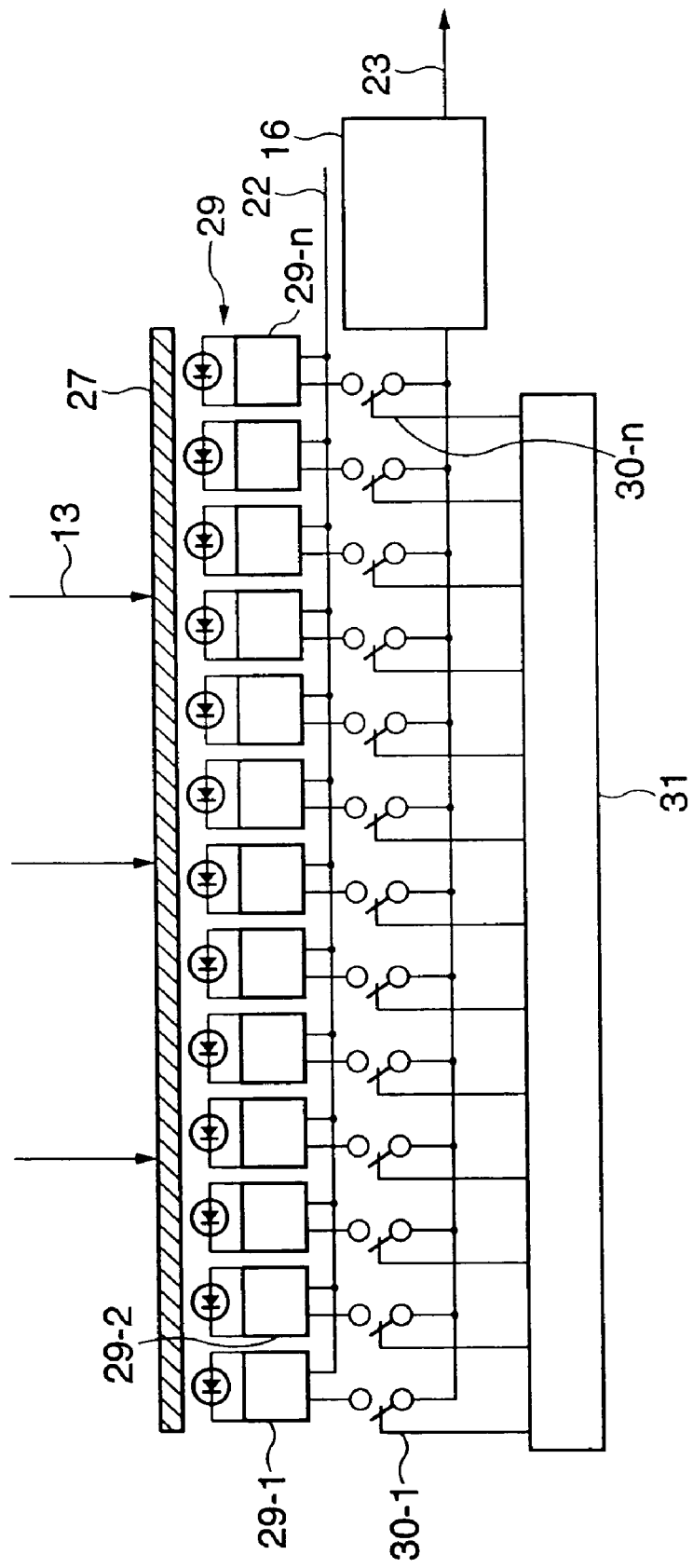
FIG. 3 is a diagram showing an example of the arrangement of the illuminance uniformity sensor (photoelectric sensor) in which a plurality of photoelectric converters are arrayed.

A photoelectric sensor in which a plurality of photoelectric converters are arrayed will be described. FIG. 3 is a diagram showing an example of the arrangement of an illuminance uniformity sensor 18 in which a plurality of photoelectric converters are arrayed. The illuminance uniformity sensor 18 shown in FIG. 3 has a photodiode array (photoelectric array) 29, and the array 29 is comprised of first to nth photoelectric converters 29-1 to 29-*n*. Each photoelectric converter can be formed by a photodiode 15 and charge storage 19 shown in FIG. 2.

The charge storages of the photoelectric converters 29-1 to 29-*n* are connected to charge transmission switches 30-1 to 30-*n* for transmitting charges stored in the charge storages to a current-to-voltage converter 16. The switches 30-1 to 30-*n* are sequentially turned on to sequentially supply charges stored in the charge storages of the photoelectric converters 29-1 to 29-*n* to the current-to-voltage converter 16. Stored charges flow into the current to voltage converter 16 to reset a charge storage which has emitted stored charges.

The charge transmission switches 30-1 to 30-*n* are sequentially turned on by a shift register (scanning circuit) 31 by a method to be described later. Charges stored in an ON charge storage are converted into a voltage by the current-to-voltage converter 16, and the voltage is output as exposure amount data 23 to a main control system 25. The charge transmission switches 30-1 to 30-*n* and the shift register 31 constitute all or part of a read circuit.

In the second embodiment, the exposure amount data 23 is an analog voltage signal. This signal is A/D-converted by an A/D converter (not shown) in the main control system 25, written in a memory 25*m*, and then processed.

Figure 4:
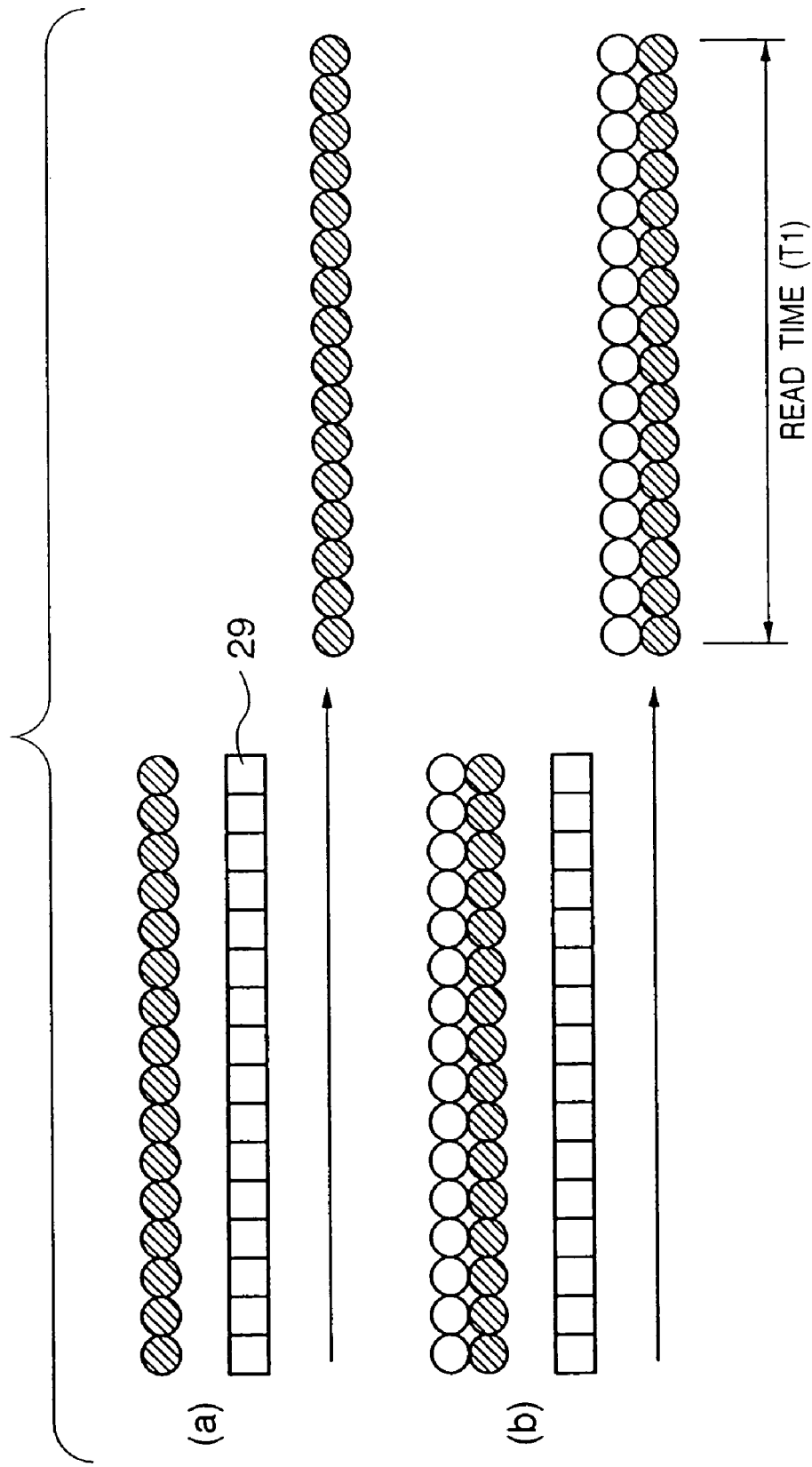
FIG. 4 is a view showing stored charges and read of a photodiode array.

For a deeper understanding of the second embodiment, a problem in the use of a photoelectric sensor array will be explained with reference to FIG. 4. FIG. 4 schematically shows pulse emission of a light source 1 in the exposure apparatus and corresponding operation of the photodiode array (photoelectric array) 29.

(a) of FIG. 4 schematically shows a method of reading charges every emission of one pulse. In (a) of FIG. 4, each ● represents charges generated in the photodiode in accordance with emission of one pulse by the light source 1 such as an excimer laser. Charges are externally transferred via the current-to-voltage converter 16 by sequentially turning on the charge transmission switches 30-1 to 30-*n* in a direction indicated by an arrow.

The dots ● on the right side in (a) of FIG. 4 represent data which are read from the photoelectric sensor 18, A/D-converted, and stored in the memory 25*m*. Read of all signals (charges) in the photodiode array 29 by the general read method takes a read time given by equation (3):

$$\text{Read time}(T1) = (\text{charge read time per photoelectric converter}) \times (\text{number of photoelectric converters}) \quad (3)$$

(b) of FIG. 4 shows a method of reading charges of two pulses. In (b) of FIG. 4, ● represents charges stored by emission of the first pulse, and ○ represents charges stored by emission of the second pulse. More specifically, in (b) of FIG. 4, charges corresponding to pulse beams of two pulses generated by the light source 1 are stored in the photoelectric converters 29-1 to 29-*n* of the photodiode array 29, and then read. In the example of (b) of FIG. 4, charges in the photoelectric converters 29-1 to 29-*n* of the photodiode array 29 are read every time emission of two pulses ends. Read must be executed before the start of the next pulse emission, and the read time (T1) must be shorter than the time interval of the pulse emission. That is, the time permitted as the read time (T1) is equal between (a) and (b) of FIG. 4.

Assuming that the charge read time of one photoelectric converter is 2 μsec and the number of photoelectric converters is 256, the read time (T1) taken to read charges in all the photoelectric converters is 2 μsec×256=0.512 msec.

When the emission frequency of the light source 1 is 1,000 Hz, the emission pulse cycle is 1 msec, and 256 signals can be read with a temporal margin within the time interval between pulses, as shown in (a) of FIG. 4. However, when the emission frequency of the light source 1 is 2,000 Hz, the emission pulse cycle is 0.5 msec, and signals cannot be read within the time interval between pulses. That is, as the emission frequency of the light source 1 increases, it becomes more difficult to read signals from all the photoelectric converters within the time interval of the pulse emission.

Figure 5:
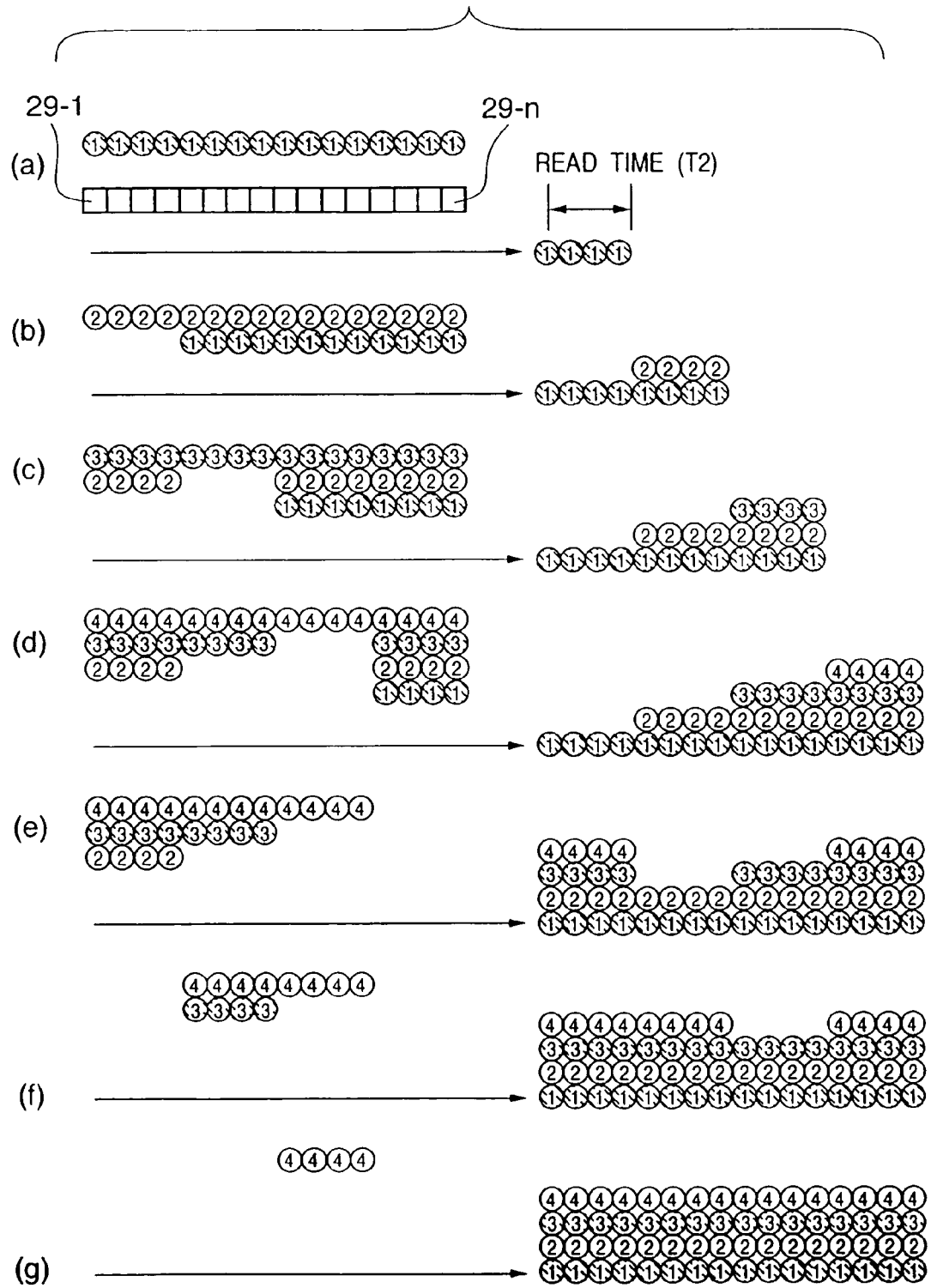
FIG. 5 is a view showing stored charges and a divisional read of the photodiode array.

Under this circumstance, the second embodiment provides a read method as shown in FIG. 5. In FIG. 5, the number of photoelectric converters is 16 (i.e., n=16) for descriptive convenience. In FIG. 5, the dots ● numbered "1" represent charges by the first pulse; the circles ○ numbered "2", charges by the second pulse; the dots ● numbered "3", charges by the third pulse; and the circles ○ numbered "4", charges by the fourth pulse.

Before emission of the light source 1 such as an excimer laser, the main control system 25 sends to the charge storages of the photoelectric converters 29-1 to 29-16 a charge reset command signal 22 for resetting stored charges. As shown in (a), charges (charges numbered "1") are stored by a pulse beam of the first pulse from the light source 1 such as an excimer laser. The shift register 31 is then driven to read charges from the photoelectric converters 29-1 to 29-4 serving as part (first block) of the array 29. Charges are stored at the first to fourth addresses in the memory 25*m*, and driving of the shift register 31 is suspended.

As shown in (b), charges (charges numbered "2") are stored by a pulse beam of the second pulse from the light source 1. Driving of the shift register 31 restarts to read charges from the photoelectric converters 29-5 to 29-8 serving as part (second block) of the array 29. Charges are stored at the fifth to eighth addresses in the memory 25*m*.

As shown in (c), charges (charges numbered "3") are stored by a pulse beam of the third pulse from the light source 1. Driving of the shift register 31 restarts to read charges from the photoelectric converters 29-9 to 29-12 serving as part (third block) of the array 29. Charges are stored at the ninth to twelfth addresses in the memory 25*m*.

As shown in (d), charges (charges numbered "4") are stored by a pulse beam of the fourth pulse from the light source 1. Driving of the shift register 31 restarts to read charges from the photoelectric converters 29-13 to 29-16 serving as part (fourth block) of the array 29. Charges are stored at the thirteenth to sixteenth addresses in the memory 25*m*.

The operation from (a) to (d) is repeated until the end of emission from the excimer laser.

As shown in (e), charges in the photoelectric converters 29-1 to 29-4 are read without emitting light from the light source 1. Read data are added to data stored at the first to fourth addresses in the memory 25m, and stored again at these addresses. Similarly, as shown in (f) and (g), charges in the photoelectric converters 29-5 to 29-8 and 29-9 to 29-12 are read without emitting light from the light source 1. Read data are added to data stored at the fifth to eighth addresses and the ninth to twelfth addresses in the memory 25m, and stored again at these addresses.

By the above sequence, exposure amount data representing the cumulative light quantity of the pulse beams of the four pulses stored in the photoelectric converters 29-1 to 29-n of the photodiode array 29 is stored in the memory 25m.

In a read by dividing 256 photoelectric converters into four (in FIG. 4, dividing 16 photoelectric converters into four), the data read time (T2) per pulse from the light source 1 is given by 2 μsec×256/4=0.128 msec.

This time is much shorter than a pulse interval of 0.5 msec obtained when the emission frequency of the light source 1 is set to 2,000 Hz. Thus, charges in all the photoelectric converters of a block subjected to a read (one of the four divided blocks) can be read as exposure amount data by using the time interval between pulses. For a high emission frequency of the light source 1, the division number of the photodiode array 29 in read is increased. An increase in division number means a decrease in the number of photoelectric converters subjected to a read at one time interval between pulse beams.

As described above, according to the second embodiment, whether to read charges by dividing the photodiode array 29 and further, the division number in a divisional read are determined in accordance with the emission frequency of the light source 1. Even if the emission frequency increases, exposure amount data can be obtained from all the photoelectric converters of the phototransistor array by using a plurality of time intervals between pulse beams while obtaining exposure amount data from some photoelectric converters of the phototransistor array by using each time interval between pulse beams. In other words, the second embodiment changes or determines the read method of the photodiode array 29 so as to obtain necessary exposure amount data in accordance with the emission frequency of the light source 1. The division number (or the number of photoelectric converters subjected to read at one time interval between pulse beams) or the read method is determined and changed by the main control system 25 in accordance with the emission frequency of the light source 1.

The method of changing the photodiode array read method in accordance with the emission frequency of a pulse beam can be applied not only to an exposure apparatus, but also to any apparatus which measures a pulse beam by using a photodiode array.

The technical concept described as the first embodiment can be combined with the technical concept described as the second embodiment. More specifically, also in the second embodiment, similar to the first embodiment, the pulse count by which integration and storage are executed can be changed in accordance with the intensity of light incident on the photoelectric sensor to make an output from the photoelectric sensor fall within a limited dynamic range. In this case, a necessary dynamic range can be widened in accordance with an increase in the division number of a photoelectric sensor in read.

Figure 6:
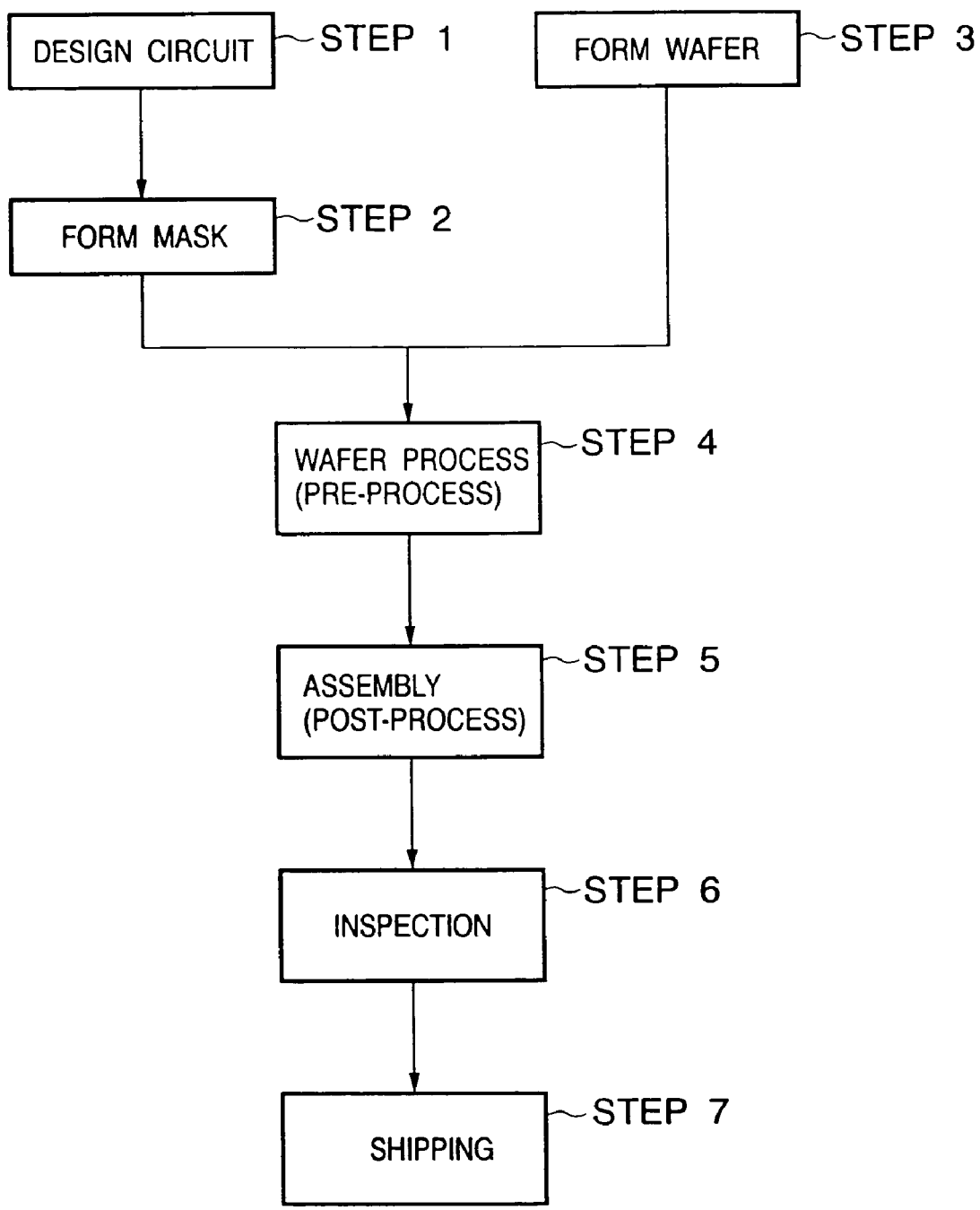
FIG. 6 is a flow chart showing the manufacturing flow of a microdevice.

An embodiment of a device production method using the above described exposure apparatus or exposure method will be described. FIG. 6 is a flow chart showing the manufacturing flow of a microdevice (e.g., a semiconductor chip such as an IC or LSI, a liquid crystal panel, a CCD, a thin film magnetic head, a micromachine, or the like). In step 1 (circuit design), a device pattern is designed. In step 2 (mask formation), a mask having the designed pattern is formed. In step 3 (wafer formation), a wafer is formed using a material such as silicon or glass. In step 4 (wafer process), called a pre-process, an actual circuit is formed on the wafer by lithography using the prepared mask and wafer. Step 5 (assembly), called a post-process, is the step of forming a semiconductor chip by using the wafer formed in step 4, and includes an assembly process (dicing and bonding) and a packaging process (chip encapsulation). In step 6 (inspection), the semiconductor device manufactured in step 5 undergoes inspections such as an operation confirmation test and a durability test. After these steps, the semiconductor device is completed and shipped (step 7).

Figure 7:
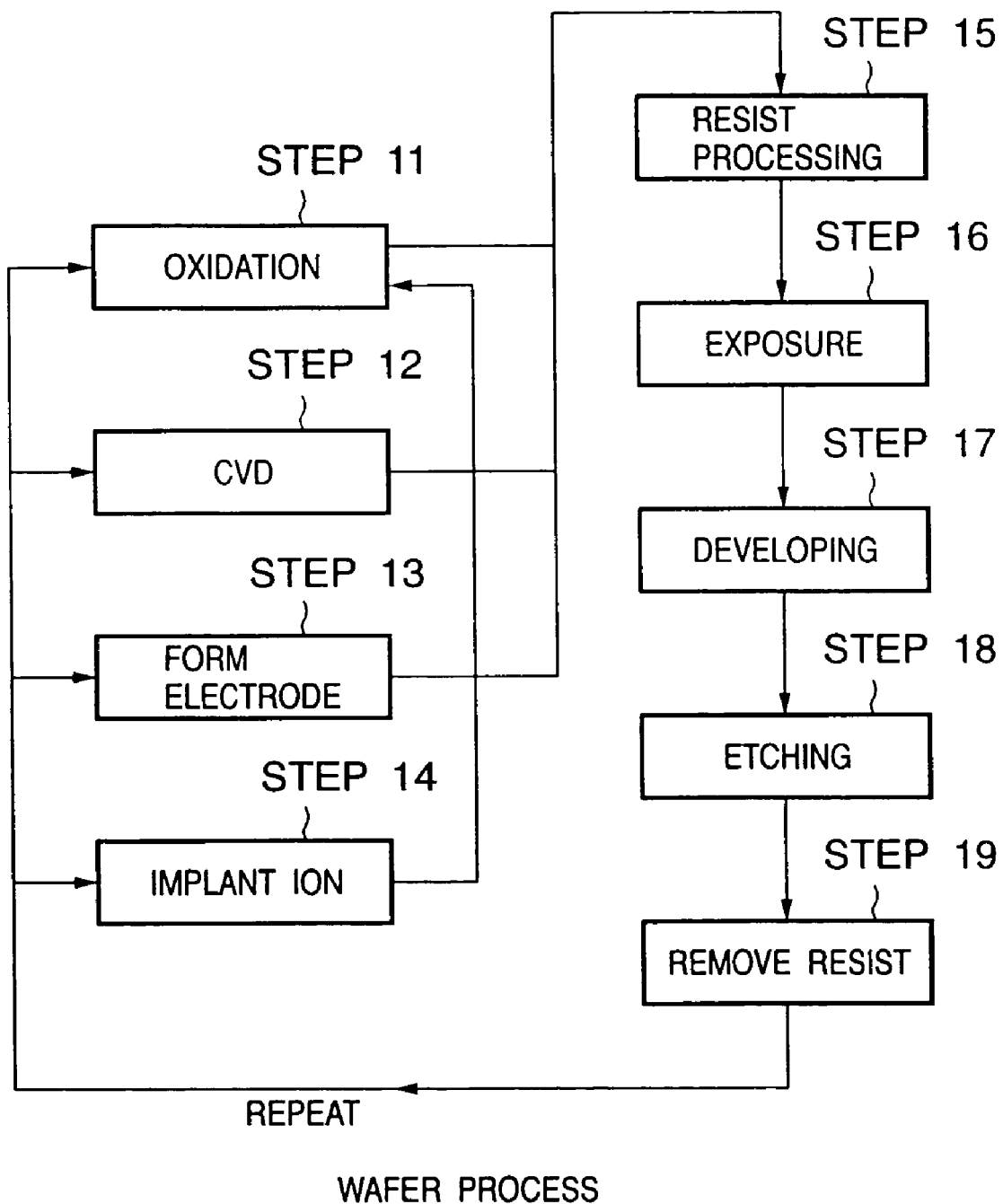
FIG. 7 is a flow chart showing the detailed flow of a wafer process in FIG. 6.

FIG. 7 is a flow chart showing the detailed flow of the wafer process. In step 11 (oxidation), the wafer surface is oxidized. In step 12 (CVD), an insulating film is formed on the wafer surface. In step 13 (electrode formation), an electrode is formed on the wafer by vapor deposition. In step 14 (ion implantation), ions are implanted in the wafer. In step 15 (resist processing), a photosensitive agent is applied to the wafer. In step 16 (exposure), the wafer is exposed to the circuit pattern of the mask by the above-mentioned exposure apparatus having the integrated exposure amount measurement device. In step 17 (developing), the exposed wafer is developed. In step 18 (etching), the resist is etched except the developed resist image. In step 19 (resist removal), an unnecessary resist after etching is removed. These steps are repeated to form multiple circuit patterns on the wafer.

The present invention can provide an exposure apparatus which easily copes with an increase in the emission frequency of a light source and, more specifically, an exposure apparatus capable of properly reading an electrical signal from a photoelectric sensor by using the time interval between emission pulses even at a high emission frequency of the light source.

As many apparently widely different embodiments of the present invention can be made without departing from the spirit and scope thereof, it is to be understood that the invention is not limited to the specific embodiments thereof except as defined in the claims.

What is claimed is:

1. An exposure apparatus which transfers a pattern onto a substrate by using pulse beams periodically, successively emitted by a light source for generating a pulse beam, said apparatus comprising:

an illumination optical system for generating periodic pulse beams on the substrate;

a photoelectric array having a plurality of photoelectric converters which detect the pulse beams as electrical signals; and a read circuit which reads the electrical signals from the plurality of photoelectric converters of said photoelectric array, wherein said read circuit stores, in the plurality of photoelectric converters of said photoelectric array, charges corresponding to light quantities of pulse beams periodically, successively emitted by the light source to said photoelectric array, and reads electrical signals from all the plurality of photoelectric converters by using a plurality of time intervals between the pulse beams while reading electrical signals from some of the plurality of photoelectric converters by using each time interval between the pulse beams; and an adder which adds electrical signals read from the same photoelectric converter at different times.

2. An exposure apparatus which transfers a pattern onto a substrate by using pulse beams periodically, successively emitted by a light source for generating a pulse beam, said apparatus comprising:

an illumination optical system for generating periodic pulse beams on the substrate;

a photoelectric array having a plurality of photoelectric converters which detect the pulse beams as electrical signals; and a read circuit which reads the electrical signals from the plurality of photoelectric converters of said photoelectric array, wherein said read circuit stores, in the plurality of photoelectric converters of said photoelectric array, charges corresponding to light quantities of pulse beams periodically, successively emitted by the light source to said photoelectric array, and reads electrical signals from all the plurality of photoelectric converters by using a plurality of time intervals between the pulse beams while reading electrical signals from some of the plurality of photoelectric converters by using each time interval between the pulse beams; and wherein the number of photoelectric converters from which electrical signals are read by said read circuit at one time interval between pulses is determined in accordance with an emission frequency of the light source.

3. An exposure apparatus which transfers a pattern onto a substrate by using pulse beams periodically, successively emitted by a light source for generating a pulse beam, said apparatus comprising:

an illumination optical system for generating periodic pulse beams on the substrate;

a photoelectric array having a plurality of photoelectric converters which detect the pulse beams as electrical signals; and a read circuit which reads the electrical signals from the plurality of photoelectric converters of said photoelectric array, wherein said read circuit stores, in the plurality of photoelectric converters of said photoelectric array, charges corresponding to light quantities of pulse beams periodically, successively emitted by the light source to said photoelectric array, and reads electrical signals from all the plurality of photoelectric converters by using a plurality of time intervals between the pulse beams while reading electrical signals from some of the plurality of photoelectric converters by using each time interval between the pulse beams; and wherein the number of photoelectric converters is determined to a relatively small number for a high emission frequency of the light source, and a relatively large number for a low emission frequency of the light source.

* * * * *